US 9,261,863 B2

(12) United States Patent
Sloop et al.

(10) Patent No.: US 9,261,863 B2
(45) Date of Patent: Feb. 16, 2016

(54) OPTIMIZING AND CONTROLLING THE ENERGY CONSUMPTION OF A BUILDING

(71) Applicants: Earth Networks, Inc., Germantown, MD (US); University of Maryland, College Park, College Park, MD (US)

(72) Inventors: Christopher Dale Sloop, Mount Airy, MD (US); David Oberholzer, Brookville, MD (US); Robert S. Marshall, Ijamsville, MD (US); Jungho Kim, College Park, MD (US); Michael Siemann, Bethesda, MD (US)

(73) Assignees: Earth Networks, Inc., Germantown, MD (US); University of Maryland College Park, College Park, MD (US)

( * ) Notice: Subject to any disclaimer, the term of this patent is extended or adjusted under 35 U.S.C. 154(b) by 360 days.

(21) Appl. No.: 13/729,501

(22) Filed: Dec. 28, 2012

(65) Prior Publication Data

US 2013/0190940 A1 Jul. 25, 2013

Related U.S. Application Data

(60) Provisional application No. 61/589,639, filed on Jan. 23, 2012.

(51) Int. Cl.
*G05B 13/02* (2006.01)
*G05B 15/02* (2006.01)

(52) U.S. Cl.
CPC .............. *G05B 13/02* (2013.01); *G05B 15/02* (2013.01); *G05B 2219/2642* (2013.01)

(58) Field of Classification Search
None
See application file for complete search history.

(56) References Cited

U.S. PATENT DOCUMENTS

| 5,936,776 | A | 8/1999 | Kreitzer |
| 6,098,893 | A | 8/2000 | Berglund et al. |
| 6,216,956 | B1 | 4/2001 | Ehlers et al. |
| 6,577,962 | B1 | 6/2003 | Afshari |
| 7,848,900 | B2 | 12/2010 | Steinberg et al. |
| 7,908,116 | B2 | 3/2011 | Steinberg et al. |
| 7,908,117 | B2 | 3/2011 | Steinberg et al. |
| 8,010,237 | B2 | 8/2011 | Cheung et al. |
| 8,019,567 | B2 | 9/2011 | Steinberg et al. |

(Continued)

OTHER PUBLICATIONS (C1) International Search Report and Written Opinion from co-pending PCT application No. PCT/US13/22734, dated Apr. 8, 2013, 14 pages.

*Primary Examiner* — Darrin Dunn
*Assistant Examiner* — Geoffrey Wellman
(74) *Attorney, Agent, or Firm* — Proskauer Rose LLP

(57) ABSTRACT

Described herein are methods and systems, including computer program products, for optimizing and controlling the energy consumption of a building. A first computing device generates a set of thermal response coefficients for the building based on energy characteristics of the building and weather data associated with the location of the building. The first computing device predicts an energy response of the building based on the set of thermal response coefficients and forecasted weather associated with the location of the building. The first computing device selects minimal energy requirements of the building based on an energy consumption cost associated with the building. The first computing device determines one or more temperature set points for the building based on the energy response and the minimal energy requirements. The first computing device transmits the one or more temperature set points to a thermostat of the building.

59 Claims, 4 Drawing Sheets

(56) References Cited

U.S. PATENT DOCUMENTS

| | | |
|---|---|---|
| 8,090,477 B1 | 1/2012 | Steinberg |
| 8,108,492 B2 | 1/2012 | Arunachalam |
| 8,131,497 B2 | 3/2012 | Steinberg et al. |
| 8,131,506 B2 | 3/2012 | Steinberg et al. |
| 8,340,826 B2 | 12/2012 | Steinberg |
| 2005/0102068 A1 | 5/2005 | Pimputkar et al. |
| 2006/0255165 A1 | 11/2006 | Ha |
| 2007/0112939 A1 | 5/2007 | Wilson et al. |
| 2010/0106334 A1 | 4/2010 | Grohman et al. |
| 2010/0332373 A1 | 12/2010 | Crabtree et al. |
| 2011/0178977 A1 | 7/2011 | Drees |
| 2013/0060471 A1* | 3/2013 | Aschheim ............ G01K 17/00 702/3 |

* cited by examiner

OPTIMIZING AND CONTROLLING THE ENERGY CONSUMPTION OF A BUILDING

RELATED APPLICATION

This application claims priority to Ser. No. 61/589,639, filed on Jan. 23, 2012, the entire disclosure of which is incorporated herein by reference.

FIELD OF THE TECHNOLOGY

The technology relates generally to optimizing and controlling the energy consumption of a building.

BACKGROUND

Weather is the largest variable impacting home energy demand. Many homes are equipped with a standard thermostat to regulate heating and cooling, where the occupant either manually adjusts the temperature to account for weather conditions or the thermostat automatically adjusts temperature based on a predetermined schedule. The automatic adjustment of temperature may be conducted by a utility that provides power to the home, but often such adjustments are based on incomplete or inaccurate weather information for the precise location of the home and do not factor in the occupant's personal preferences. In addition, these systems are generally not capable of accounting for the thermal characteristics of the particular building in which the thermostat is installed.

As a result, such systems react to current weather conditions and temperature needs of the home, rather than performing pre-heating and/or pre-cooling based on forecast weather conditions and the energy characteristics of the home.

SUMMARY OF THE INVENTION

The techniques described herein relate to optimizing energy use of a building (e.g., home) by dynamically controlling the thermostat of the building to pre-heat and/or pre-cool the building in response to local weather forecast conditions and when a demand response event is anticipated. In addition, the techniques provide the advantage of maintaining a desired comfort level for occupants of the building while encouraging efficient energy usage and monitoring.

In one aspect, the invention features a method for optimizing and controlling the energy consumption of a building. A first computing device generates a set of thermal response coefficients for the building based on energy characteristics of the building and weather data associated with the location of the building. The first computing device predicts an energy response of the building based on the set of thermal response coefficients and forecasted weather associated with the location of the building. The first computing device selects minimal energy requirements of the building based on an energy consumption cost associated with the building. The first computing device determines one or more temperature set points for the building based on the energy response and the minimal energy requirements. The first computing device transmits the one or more temperature set points to a thermostat of the building.

In another aspect, the invention features a system for optimizing and controlling the energy consumption of a building. The system includes a first computing device configured to generate a set of thermal response coefficients for the building based on energy characteristics of the building and weather data associated with the location of the building. The first computing device is configured to predict an energy response of the building based on the set of thermal response coefficients and forecasted weather associated with the location of the building. The first computing device is configured to select minimal energy requirements based on an energy consumption cost associated with the building. The first computing device is configured to determine one or more temperature set points for the building based on the energy response and the minimal energy requirements. The first computing device is configured to transmit the one or more temperature set points to a thermostat of the building.

In another aspect, the invention features a computer program product, tangibly embodied in a non-transitory computer readable storage medium, for optimizing and controlling the energy consumption of a building. The computer program product includes instructions operable to cause a data processing apparatus to generate a set of thermal response coefficients for the building based on energy characteristics of the building and weather data associated with the location of the building. The computer program product includes instructions operable to cause a data processing apparatus to predict an energy response of the building based on the set of thermal response coefficients and forecasted weather associated with the location of the building. The computer program product includes instructions operable to cause a data processing apparatus to select minimal energy requirements based on an energy consumption cost associated with the building. The computer program product includes instructions operable to cause a data processing apparatus to determine one or more temperature set points for the building based on the energy response and the minimal energy requirements. The computer program product includes instructions operable to cause a data processing apparatus to transmit the one or more temperature set points to a thermostat of the building.

In another aspect, the invention features a system for optimizing and controlling the energy consumption of a building. The system includes means for generating a set of thermal response coefficients for the building based on energy characteristics of the building and weather data associated with the location of the building. The system includes means for predicting an energy response of the building based on the set of thermal response coefficients and forecasted weather associated with the location of the building. The system includes means for selecting minimal energy requirements of the building based on an energy consumption cost associated with the building. The system includes means for determining one or more temperature set points for the building based on the energy response and the minimal energy requirements. The system includes means for transmitting the one or more temperature set points to a thermostat of the building.

In another aspect, the invention features a method for computing the stored energy in a building. A first computing device determines a price for energy available to be supplied to the building. The first computing device generates a set of thermal response coefficients for the building based on energy characteristics of the building and weather data associated with the location of the building. The first computing device predicts an energy response of the building based on the set of thermal response coefficients and forecasted weather associated with the location of the building. The first computing device selects minimal energy requirements of the building based on an energy consumption cost associated with the building. The first computing device determines one or more temperature set points for the building based on the energy response and the minimal energy requirements. The first computing device transmits the one or more temperature set points to a thermostat of the building.

Any of the above aspects can include one or more of the following features. In some embodiments, generating the set of thermal response coefficients is further based on physical data of the building. In some embodiments, the physical data includes at least one of: thermal mass, wind infiltration, relative area of windows, amount of insulation, wind infiltration of the building, material of construction, and efficiency of an associated HVAC system. In some embodiments, the predicted energy response is ranked based on predetermined criteria.

In some embodiments, predicting an energy response is further based on the energy consumption cost associated with the building. In some embodiments, the energy consumption cost represents an amount of power required to change a temperature of the building for various external temperatures. In some embodiments, the energy characteristics comprise an indoor temperature of the building and a status of an HVAC system in the building, wherein the HVAC system includes one or more stage heating or cooling units.

In some embodiments, the minimal energy requirements comprise a power consumption amount of an HVAC system in the building and a duty cycle of the HVAC system. In some embodiments, determining one or more temperature set points is further based on weather forecast data, a comfort preference provided by an occupant of the building, or both. In some embodiments, the first computing device transmits the predicted energy response to a remote computing device for display to a user. In some embodiments, the remote computing device receives a temperature preference based on input provided by the user.

In some embodiments, the one or more temperature set points transmitted to the thermostat comprise a schedule for control of the thermostat over a period of time. In some embodiments, the first computing device receives the weather data from a network of remote sensors. In some embodiments, the weather data is received in real time.

In some embodiments, the first computing device receives the thermostat data from a device connected to an HVAC system inside the building. In some embodiments, the thermostat data is received at predetermined time intervals. In some embodiments, the thermostat data is received in real time.

In some embodiments, the first computing device adjusts the generated set of thermal response coefficients for error correction. In some embodiments, the adjusting includes filtering anomalies from the generated set of thermal response coefficients. In some embodiments, the weather data includes current weather conditions at the location of the building, forecast weather conditions for the location of the building, solar load at the location of the building, or any combination thereof.

In some embodiments, the first computing device compares the predicted energy response of the building to a predicted energy response of one or more other buildings, and the first computing device ranks the predicted energy response of the building based on the comparison.

In some embodiments, the selected optimal energy requirements are based on at least a comfort preference provided by an occupant of the building, a second computing device determines one or more temperature set points that change the energy response of the building to use less energy and diverge from the comfort preference; and the second computing device transmits the determined temperature set points to the thermostat of the building. In some embodiments, the second computing device is operated by an energy provider. In some embodiments, the first computing device and the second computing device are the same.

In some embodiments, an amount of energy saved by changing the energy response of the building to use less energy is determined. In some embodiments, the amount of energy saved is translated into a corresponding energy consumption cost.

In some embodiments, the first computing device determines a price for energy available to be supplied to the building, determines an amount of stored energy associated with the building based on the energy response and the minimal energy requirements, and transmits an energy consumption action to the thermostat of the building based on the amount of stored energy and the price for energy. In some embodiments, the amount of stored energy is determined at different points during a given time period.

In some embodiments, generating a set of thermal response coefficients for the building is further based on smart meter data. In some embodiments, the use of temperature-affecting devices in the building is controlled based on the one or more temperature set points received by the thermostat. In some embodiments, the temperature-affecting devices include fans, humidifiers, and light shades.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
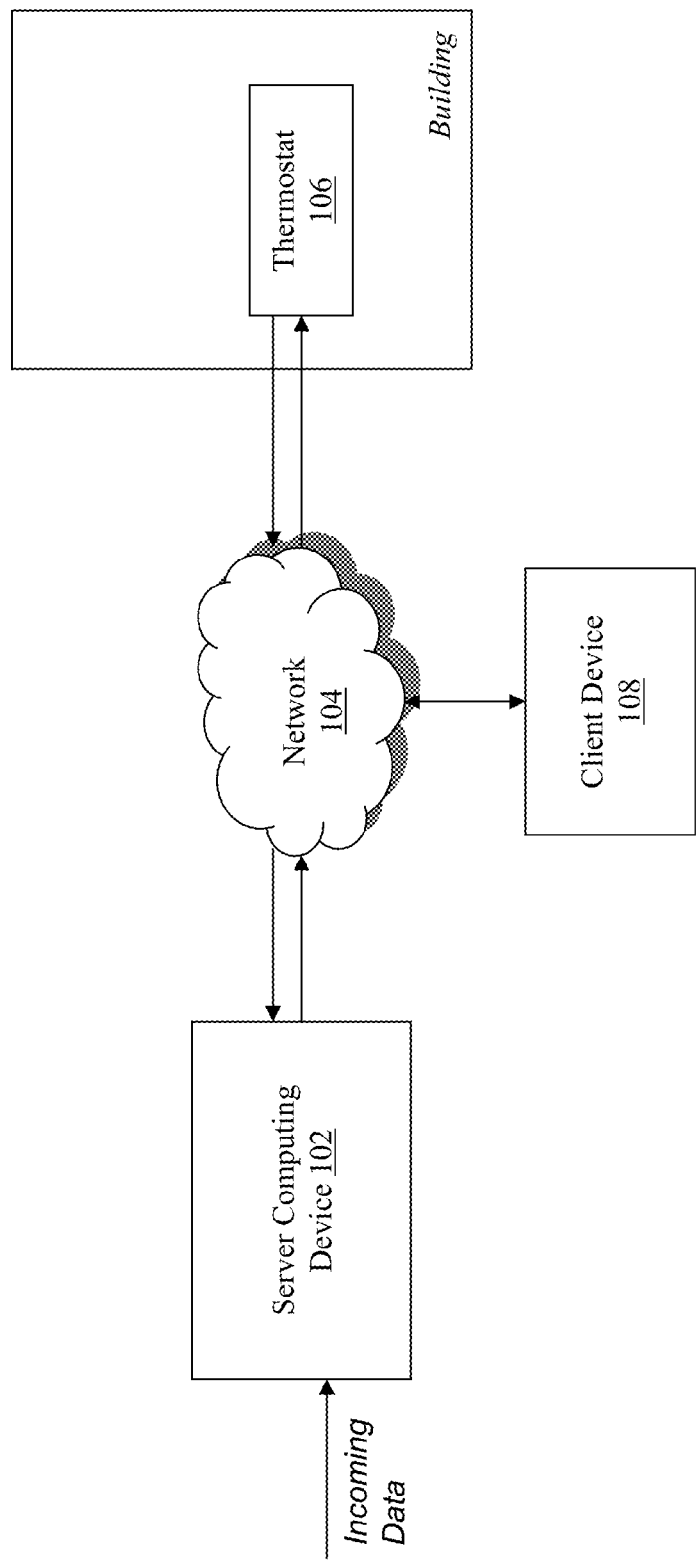
FIG. 1 is a block diagram of a system for optimizing and controlling the energy consumption of a building.

FIG. 1 is a block diagram of a system 100 for optimizing and controlling the energy consumption of a building. The system 100 includes a server computing device 102, a communications network 104, a thermostat device 106 that controls the heating and/or cooling apparatus for a building, and a client computing device 108. The server computing device 102 receives data from external sources (e.g., weather data, thermostat data) and determines energy response characteristics and energy requirements for a particular building. The server computing device 102 determines a temperature set point for the building, and transmits the set point to the thermostat 106 via the network 104 so that the thermostat can adjust the heating/cooling conditions of the building appropriately. The server computing device 102 also interfaces with a client computing device 108 via the network 104 to provide a portal (e.g., a web browser interface) through which a user can view the energy response characteristics and energy requirements for a building (e.g., the user's house). The user can also, for example, manually adjust the temperature set points for the thermostat 106, and set up a comfort profile with the user's heating/cooling preferences so the server computing device 102 can automatically adjust the thermostat 106 based on the comfort profile.

Figure 2:
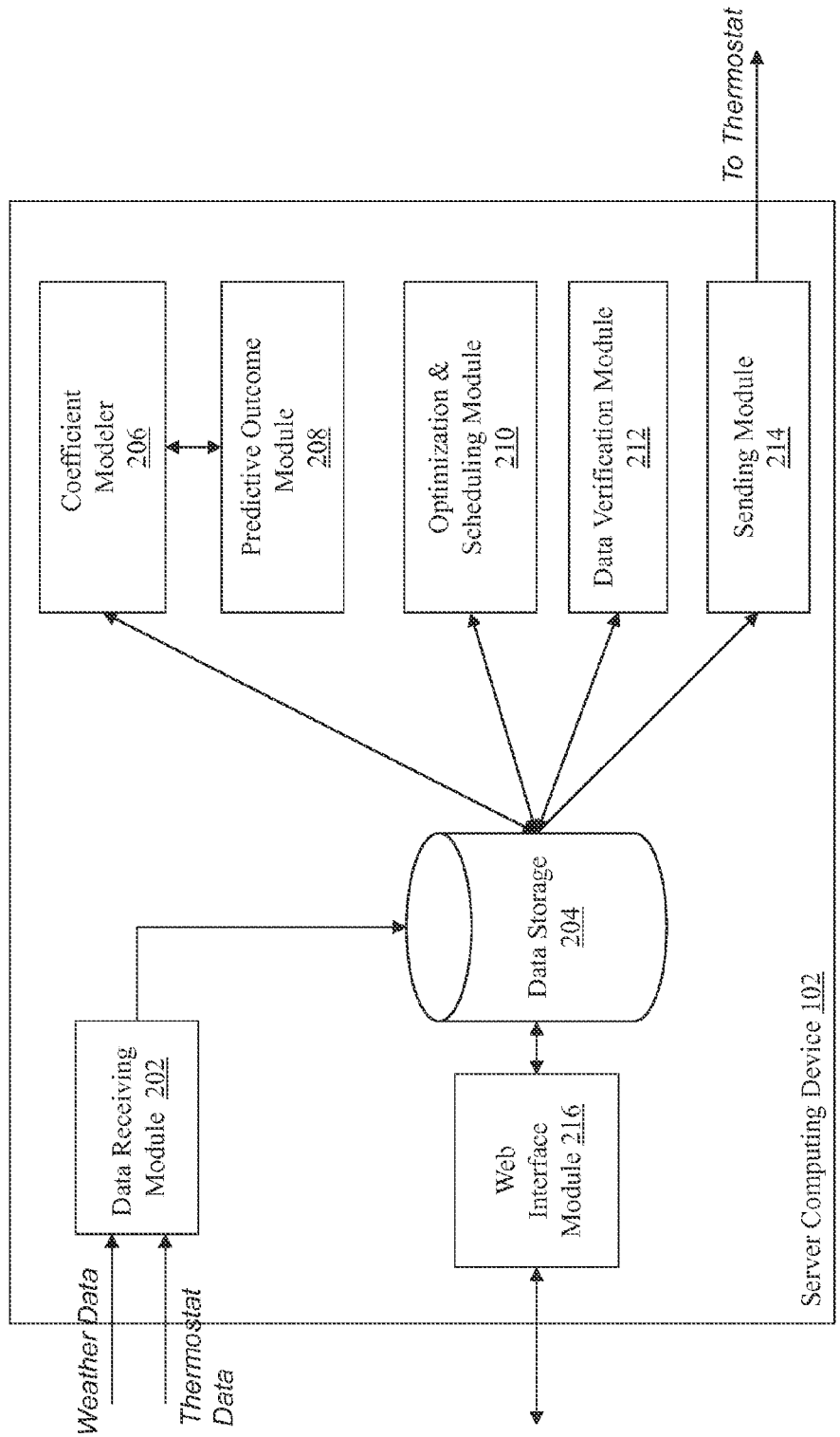
FIG. 2 is a detailed block diagram of a server computing device for optimizing and controlling the energy consumption of a building.

FIG. 2 is a detailed block diagram of the server computing device 102 for optimizing and controlling the energy consumption of a building. The server computing device 102 includes a data receiving module 202, a data storage 204, a coefficient modeler 206, a predictive outcome module 208, an optimization and scheduling module 210, a data verification module 212, a sending module 214, and a web interface module 216. It should be appreciated that, although FIG. 2 shows the components (e.g., 202, 204, 206, 208, 210, 212, 214 and 216) as within a single server computing device 102, in some embodiments the components are distributed on different physical devices without departing from the spirit or scope of the invention. Also, in embodiments where the components are distributed on different physical devices, those devices can reside at the same physical location or may be dispersed to different physical locations.

The data receiving module 202 provides an interface between external data sources (e.g., weather databases, energy providers and building thermostats) and the data storage 204 of the server computing device 102. The data receiving module 202 receives data associated with atmospheric conditions and weather from various external data collection and/or monitoring systems (e.g., NWS, NOAA, Earth Networks Weather Network). Other sources of information include, but are not limited to, governmental agencies and third-party private companies. The atmospheric conditions and weather data can include, but is not limited to, current conditions information, forecast information and weather alert information. The atmospheric conditions and weather data can be categorized by location (e.g., zip code or GPS coordinates). The data receiving module 202 communicates with the various external data systems and sources via standard communications networks and methods.

The data receiving module 202 also receives information from thermostat devices (e.g., thermostat 106) that are located within buildings and that control the heating and/or cooling apparatuses for the buildings. For example, the thermostat 106 transmits characteristics about its current operation status (e.g., current temperature setting, heating mode, cooling mode, power settings, efficiency conditions) to the server computing device 102. In some embodiments, the data receiving module 202 also gathers information from a smart meter (e.g., electric meter, gas meter, or water meter) located at the building. The smart meter is configured to record consumption of energy in predetermined intervals (e.g., one hour) and communicate the recorded information to the utility that provides service to the building. The data receiving module 202 can receive the recorded consumption information and correlate the energy usage with other types of data (e.g., thermostat data, exterior weather data) to determine how changes in outside weather conditions and adjustment of the thermostat settings impact energy consumption.

The data receiving module 202 consolidates and aggregates the received information into a format conducive for storage in the data storage 204 and processing by the modules 206, 208, 210, 212, 214 and 216. For example, each data source to which the data receiving module 202 is connected may transmit data using a different syntax and/or data structure. The data receiving module 202 parses the incoming data according to an understanding of the source of the data and reformat the data so that it conforms to a syntax or structure acceptable to the data storage 204 and the modules 206, 208, 210, 212, 214 and 216. In some embodiments, the external data sources transmit the information in a standard format (e.g., XML) to reduce the processing required of the data receiving module 202.

The data receiving module 202 communicates with the data storage 204 to save and retrieve data received from external sources in preparation for transmitting the data to the modules 206, 208, 210, 212, 214 and 216. In some embodiments, the data receiving module 202 transmits a notification to the coefficient modeler 206 that the data has been stored in the data storage 204 and is ready for processing by the coefficient modeler 206. The notification includes a reference indicator (e.g., a database address) of the storage location of the data within the data storage 204.

The data storage 204 is a database or other similar data structure, including hardware (e.g., disk drives), software (e.g., database management programming) or both, that stores information received by the data receiving module 202. The data storage 204 also provides data to the modules 206, 208, 210, 212, 214 and 216, and receives updated data and analysis from the modules 206, 208, 210, 212, 214 and 216.

The coefficient modeler 206 is a module that retrieves information from the data storage 208 and generates sets of thermal response coefficients associated with energy characteristics of a building. The modeler 206 determines the location of the building (e.g., by retrieving the building's zip code). In some embodiments, the modeler 206 retrieves additional data associated with the building, such as physical structure of the building (e.g., construction materials), solar orientation and load, thermal mass, and wind infiltration. In some embodiments, the modeler 206 infers the physical structure of the building, solar orientation and load, thermal mass, and/or wind infiltration based on the location of the building. In some embodiments, the modeler 206 retrieves smart meter data associated with the building that has been collected by the server computing device 102 from a smart meter installed at the building. In some embodiments, the modeler 206 extracts data from the data storage 204 in the form of a comma-separated value (.csv) file.

Based on this information, the modeler 206 determines a thermal profile for the building. Using the thermal profile in conjunction with the weather information for the location of the building, the current thermostat setting for the building, and other data associated with the building (e.g., smart meter data), the modeler 206 generates sets of thermal response coefficients based on the various characteristics that affect the heating/cooling of the building (e.g., thermal mass, solar loading, and wind infiltration) and the amount of energy consumed by the heating/cooling apparatus at the building. Each set of thermal response coefficients can be different, according to projections of the weather conditions at the location over a period of time (e.g., an hour, a day). The modeler 206 ranks the sets of thermal response coefficients based on considerations of energy usage, forecast accuracy, occupant preferences, and the like. The modeler 206 transmits the ranked thermal response coefficients to the data storage 204 for use by other modules 208, 210, 212, 214, 216 of the system 100.

The optimizing and scheduling module 210 retrieves the ranked thermal response coefficients from the data storage 204 along with additional information, such as the weather forecast associated with the location of the building and an occupant preference profile associated with the building. In some embodiments, the optimizing and scheduling module 210 also retrieves current and estimated energy prices (e.g., from the data storage 204 or from an external data source such as a utility company). The optimizing and scheduling module 210 transmits the information to the predictive outcome module 208.

The predictive outcome module 208 generates a series of temperature set points for the thermostat (e.g., thermostat 106) for the building, based on the current and forecast weather conditions for that location and each set of thermal response coefficients. The predictive outcome module 208 also generates a power usage estimate, duty cycle, and indoor temperature forecast for the heating/cooling apparatus installed the building based on the series of temperature set points. In some embodiments, the predictive outcome module 208 can also generate an estimated energy cost associated with the series of temperature set points by incorporating current energy prices into the determination.

The optimizing and scheduling module 210 receives the series of temperature set points from the predictive outcome module 208 and optimizes the results based on additional factors such as anticipated demand response events and/or occupant preferences. For example, if the weather forecast indicates that the exterior temperature will rise from 70° F. at 8:30 am to 90° F. at 11:00 am, the optimizing and scheduling module 210 determines that there will be an increased demand for energy to power air conditioning systems at that time. The optimizing and scheduling module 210 also determines that the price of energy will go up at that time. As a result, the optimizing and scheduling module 210 adjusts the series of temperature set points to provide additional cooling (i.e., pre-cool) to the home in the earlier part of the morning (e.g., 8:30 am) so that the air conditioner in the home does not need to run as long at 11:00 am when the exterior temperature is hotter. Also, the optimizing and scheduling module 210 understands that the price of energy at 8:30 am is lower than the predicted cost at 11:00 am, so an increased consumption of energy in the early morning achieves a cost savings versus consuming more energy at the later time of 11:00 am.

Once the optimizing and scheduling module 210 has adjusted the series of temperature set points, the module 210 transmits the series of temperature set points to the data storage 204. The data storage 204 transmits the series of temperature set points to the sending module 214, which communicates the temperature set points to the thermostat 106 in the building. The temperature set points provide a schedule of target temperatures for the thermostat 106 for a given time period (e.g., one day). The thermostat 106 can perform heating and/or cooling according to the schedule of temperature set points to achieve increased energy efficiency and anticipation of demand response events.

The server computing device 102 also includes a data verification module 212. The data verification module 212 retrieves energy usage data for the building from a prior time period and compares the usage data to what was predicted by the system 100 for the same time period. For example, the data verification module 212 retrieves the energy usage data (e.g., as provided by a smart meter or from a utility) for a customer's home on a particular day. The data verification module 212 also retrieves the predicted energy usage for the same day, based on the determinations performed by the modeler 206, predictive outcome module 208 and optimization and scheduling module 210. The data verification module 212 compares the two energy usage values (actual vs. predicted) to determine if any deviations occurred. Based on the comparison, the data verification module 212 can provide energy usage savings data that can be presented to the customer (e.g., via the web interface module 216). In some embodiments, the data verification module 212 determines energy savings using additional methodologies. For example, the data verification module 212 can compare a building's energy usage between (i) a day where the optimization and scheduling module 210 did not adjust the temperature set point schedule for the building's thermostat and (ii) a day where the optimization and scheduling module 210 did adjust the temperature set point schedule. The data verification module 212 can produce charts and other reports showing the energy savings achieved when the optimization and scheduling module 210 is run. In addition, the comparison information generated by the data verification module 212 is used to refine the coefficient models created by the modeler 206 to achieve greater accuracy and better efficiency.

The server computing device 102 also includes a web interface module 216. The web interface module 216 is configured to receive connection requests from client devices (e.g., client device 108 in FIG. 1) and provide a portal for the client devices to access and update the thermal profile information associated with a building. For example, a homeowner can register with the system 100 and connect to the web interface module 216 via a web browser on a client device 108. Upon logging in, the homeowner is presented with a portal containing various information related to the current energy characteristics of his home, as well as interactive features that allow the homeowner to establish and change comfort preferences for the internal temperature of his home. In some embodiments, the portal includes a home energy audit function which leverages the data stored in the system 100 (e.g., thermal profile, energy usage, weather conditions) and compares the homeowner's dwelling with other buildings that share similar thermal and/or energy consumption characteristics. The homeowner can determine the relative energy usage of his home against other homes or buildings in his area. Based on the home energy audit, the portal can also provide a customized and prioritized list of suggestions for improving the energy efficiency of the building.

Figure 3:
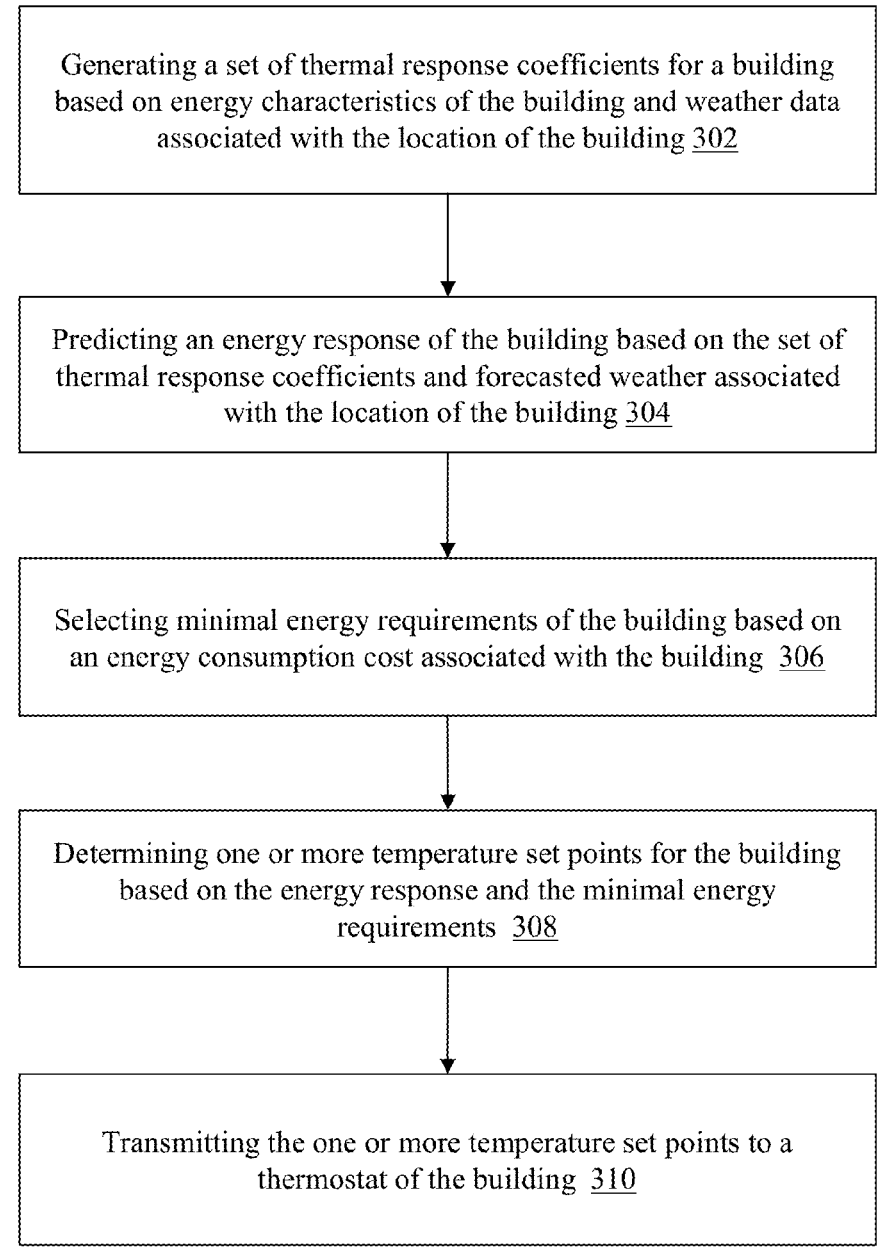
FIG. 3 is a flow diagram of a method for optimizing and controlling the energy consumption of a building.

FIG. 3 is a flow diagram of a method 300 for optimizing and controlling the energy consumption of a building. The server computing device 102, using the coefficient modeler 206, generates (302) a set of thermal response coefficients for a building based on energy characteristics of the building and weather data associated with the location of the building. The server computing device 102, using the optimization and scheduling module 210 and the predictive outcome module 208, predicts (304) an energy response of the building based on the set of thermal response coefficients and forecasted weather conditions associated with the location of the building.

The server computing device 102, using the optimization and scheduling module 210 and the predictive outcome module 208, selects (306) minimal energy requirements of the building based on an energy consumption cost associated with the building. The server computing device 102, using the optimization and scheduling module 210 and the predictive outcome module 208, determines (308) one or more temperature set points for the building based on the energy response and the minimal energy requirements. The server computing device 102, using the data verification module 212, compares the previous day's energy usage for the building against the predicted energy usage provided by the modeler 206 and the predictive outcome module 208 to determine energy usage deviations and potential energy savings. The server computing device 102, using the sending module 214, transmits (310) the one or more temperature set points to a thermostat 106 of the building.

In some embodiments, the techniques described herein are used to execute demand response events in conjunction with local or regional utilities and service providers. The predictive modeling and thermostat control features of the system 100 can be leveraged to prepare for potential demand response events identified by the utilities, and shift energy consumption by buildings connected to the system from peak demand times to lower demand times—thereby reducing the energy demand load on the utilities and potentially providing energy to the buildings at a lower cost.

For example, based on the predictive modeling, temperature set point generation, and associated analysis, the server computing device 102 determines that a certain amount of energy will be consumed by buildings connected to the system 100 over the course of the following day. The server computing device 102 also determines that, based on weather forecast information, there may be a peak demand event for energy during a two-hour window the following day (e.g., due to forecast low/high external temperatures or a forecast change in external temperature). Because the server computing device 102 has identified an amount of energy that will be potentially used during that two-hour window, the server computing device 102 can proactively adjust the temperature set points for some or all of the thermostats (e.g., thermostat 106) to reduce or eliminate consumption of energy by the buildings during the peak demand time.

Often, a utility does not have advance warning of a potential demand response event. For example, the utility may not anticipate a demand response event until one hour before the event begins. At the point when the utility becomes aware of the demand response event, the utility can inform the server computing device 102 of the upcoming event. Based on its previous analysis, the server computing device 102 can commit a particular amount of energy to the utility that will not be consumed by buildings of the system 100 during the demand response event. If the utility notifies the system 100 that the utility requires the committed amount of energy, the server computing device 102 automatically transmits adjusted temperature set point schedules to the connected thermostats that reduce energy consumption by the amount of energy committed to the utility.

The server computing device 102 can also adjust the temperature set point schedules of the thermostats to account for the reduced energy consumption while approximately maintaining the temperature desired by the occupant and/or specified in the schedule. For example, if the server computing device 102 understands that the thermostat 106 will be adjusted to consume no energy during a demand response event (e.g., mid-afternoon on a summer day), the server computing device 102 can adjust the temperature set point schedule for the thermostat 106 to pre-cool the building in advance of the demand response event so that the temperature of the building is at or near the originally-scheduled value during the event. The additional energy consumed by the pre-cooling does not occur during the demand response event—leading to reduced load on the utility and potential cost savings for the occupant. Plus, the building approximately maintains a desired/scheduled temperature during the event.

Several mathematical algorithms can be used in developing possible predictions of the energy consumed by buildings connected to the system 100, as well as predicting the specific amount of energy devoted to the operation of HVAC.

Building Energy Model Predictions

In one embodiment, a building is represented as a grey-box system balancing the sensible energy of the entire indoor environment with the flow of energy through the envelope. This type of modeling accounts for heat diffusion through the walls, convection on the inner and outer walls, solar irradiance, infiltration, thermal mass, and HVAC system performance. HVAC status data is obtained from internet connected thermostats, and electricity data from smart meters.

Transient temperatures within the wall are accounted for by solving for the temperatures at nodes within a uniform property wall using an explicit tridiagonal matrix algorithm. Inputs to the model include outdoor temperature, solar insolation, and wind speed data from local weather stations, indoor air temperature, and HVAC status data from internet connected thermostats, and electricity data from smart meters. Instead of requiring detailed measurements of building characteristics such as insulation R-values and fenestration ratios, effective parameter values are calculated from the data.

The exemplary solution technique consists of using a Genetic Algorithm to obtain a least squares curve that fits the modeled indoor air temperatures to the measured temperatures. The parameters are updated periodically to account for changes in the weather and building status. Energy forecasts are made by running the model with weather forecast data, user thermostat set points, and in the case of demand response events, updated set points to reflect the particular strategy proposed to be deployed.

HVAC Power Disaggregation

The power required to run standard air conditioners is generally dependent on the outdoor air temperature. Air conditioners utilize a vapor compression cycle and achieve cooling by absorbing heat from the indoor environment in the evaporator and rejecting it outside in the condenser. To get this heat transfer in the condenser, the refrigerant needs to be hotter than the outdoor air. Modern systems then compensate for variable outdoor air temperatures by adjusting the difference in pressure between the evaporator and condenser. When the outdoor temperature rises, this pressure differential (i.e., pressure ratio) needs to increase, requiring more power by the compressor. The same power variability with outdoor temperature is also observed in heat pumps.

This temperature dependence is important for predicting air conditioner load, and can be measured using thermostat and smart meter power data. An exemplary method has been developed that matches the smart meter data with HVAC ON/OFF time periods to determine approximate HVAC ON power spikes. These power spikes are binned by their outdoor air temperature. Then a linear regression of the binned data is used to create an HVAC power curve. This power curve can be used to approximate the load anytime the HVAC is on given outdoor temperature data or forecasts.

Figure 4:
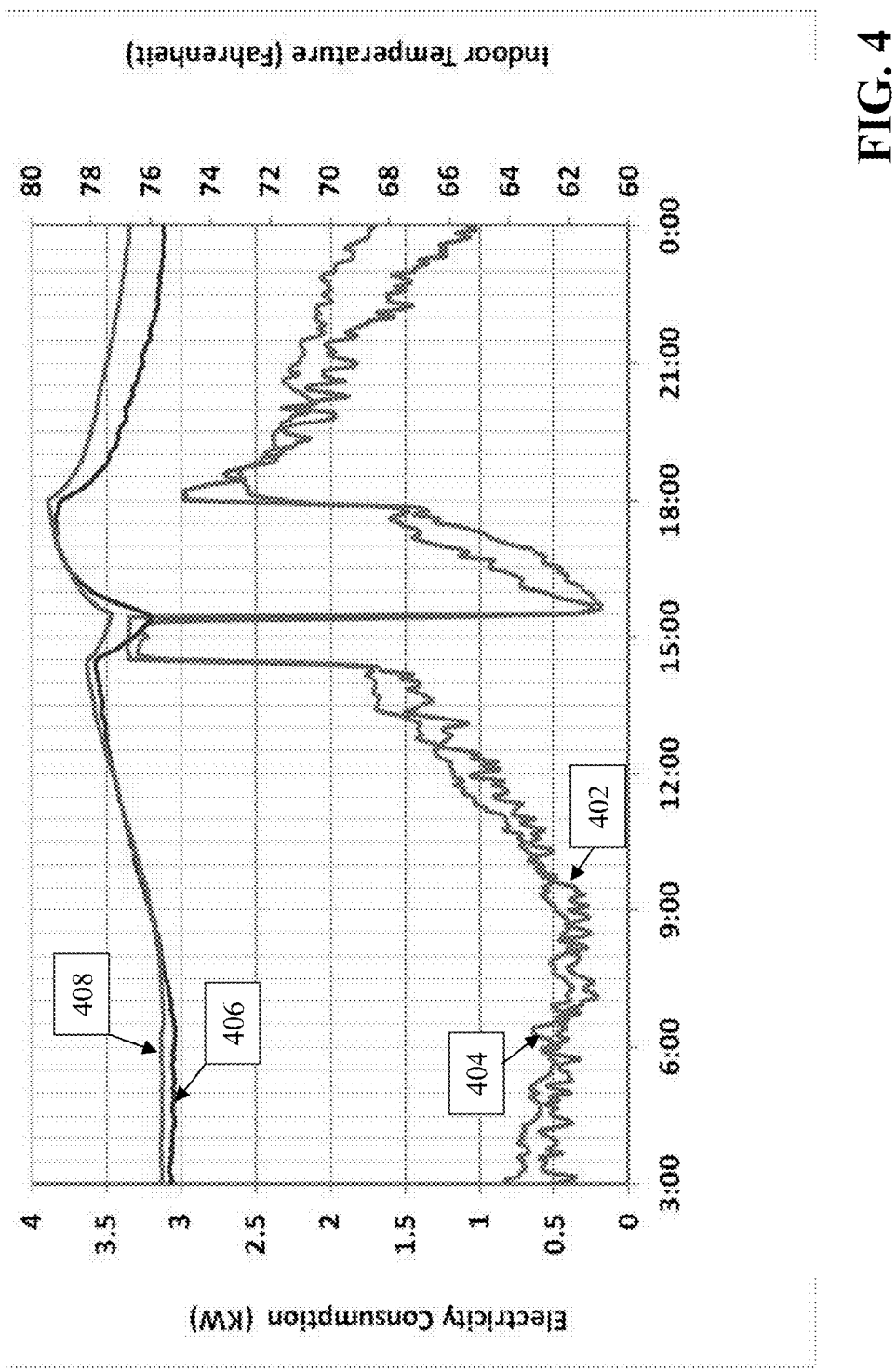
FIG. 4 is a diagram showing power usage and temperature readings as determined by predictions of the system in comparison to actual power usage and temperature readings.

FIG. 4 is a diagram showing power usage and temperature readings as determined by predictions of the system 100 in comparison to actual power usage and temperature readings for an example building over an example time period. In the graph of FIG. 4, line 402 represents the average actual power usage, line 404 represents the average power usage prediction as determined by the system 100, line 406 represents the average actual indoor temperature and line 408 represents the average indoor temperature prediction as determined by the system 100. The data depicted in FIG. 4 was captured during a demand response event. As shown in FIG. 4, the techniques described herein provide accurate predictions of demand response capacity and the impact of demand response on indoor house temperatures. The deviations between actual and predicted values for both power (e.g., 402, 404) and indoor temperature (e.g., 406, 408) are small and demonstrate the effectiveness of the system 100 in providing accurate predictions.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc. and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for optimizing and controlling the energy consumption of a building, the method comprising:
   generating, by a first computing device, a plurality of thermal response coefficient sets for the building based on energy characteristics of the building and weather data associated with the location of the building, wherein each thermal response coefficient set is generated for a different projection of weather conditions at the location of the building for a given time period, including:
      receiving, by the first computing device, an indoor air temperature of the building;
      inferring, by the first computing device, physical structure data of the building based upon the location of the building;
      determining, by the first computing device, a transient temperature within one or more walls of the building based upon indoor air temperature and the weather data associated with the location of the building; and
      adjusting, by the first computing device, the physical structure data based upon the transient temperature; and
   generating, by the first computing device, the plurality of thermal response coefficient sets for the building based upon the adjusted physical structure data;
   predicting, by the first computing device, energy responses of the building, each energy response based on a different set of thermal response coefficients;
   selecting, by the first computing device, minimal energy requirements of the building based on an energy consumption cost associated with the building;
   determining, by the first computing device, a series of temperature set points for the building based on each predicted energy response and the minimal energy requirements; and
   transmitting, by the first computing device, the series of temperature set points to a thermostat of the building.

2. The method of claim 1, wherein the physical structure data comprises at least one of: thermal mass, wind infiltration, relative area of windows, amount of insulation, material of construction, wind infiltration of the building, or efficiency of an associated HVAC system.

3. The method of claim 1, further comprising ranking, by the first computing device, the predicted energy responses based on predetermined criteria.

4. The method of claim 1, wherein the step of predicting energy responses is further based on the energy consumption cost associated with the building.

5. The method of claim 4, wherein the energy consumption cost represents an amount of power required to change an indoor temperature of the building for various external temperatures.

6. The method of claim 1, wherein the energy characteristics comprise an indoor temperature of the building and a status of an HVAC system in the building, wherein the HVAC system includes one or more stage heating or cooling units.

7. The method of claim 1, wherein the minimal energy requirements comprise a power consumption amount of an HVAC system in the building and a duty cycle of the HVAC system.

8. The method of claim 1, wherein the step of determining a series of temperature set points is further based on a comfort preference provided by an occupant of the building.

9. The method of claim 1, further comprising transmitting, by the first computing device, the predicted energy responses to a remote computing device for display to a user.

10. The method of claim 9, further comprising receiving, by the first computing device from the remote computing device, a temperature preference based on input provided by the user.

11. The method of claim 1, wherein the series of temperature set points transmitted to the thermostat comprise a schedule for control of the thermostat over a given period of time.

12. The method of claim 1, further comprising receiving, by the first computing device, the weather data from a network of remote sensors.

13. The method of claim 1, further comprising receiving, by the first computing device, thermostat data from a device connected to an HVAC system inside the building.

14. The method of claim 1, further comprising adjusting, by the first computing device, the generated thermal response coefficient sets for error correction.

15. The method of claim 1, wherein the adjusting step includes filtering anomalies from the generated thermal response coefficient sets.

16. The method of claim 1, wherein the weather data includes current weather conditions at the location of the building, forecast weather conditions for the location of the building, solar load at the location of the building, or any combination thereof.

17. The method of claim 1, further comprising
   comparing, by the first computing device, the predicted energy responses of the building to one or more predicted energy responses of one or more other buildings; and
   ranking, by the first computing device, the predicted energy responses of the building based on the comparison.

18. The method of claim 1, where the selected minimal energy requirements are based on at least a comfort preference provided by an occupant of the building, the method further comprising
   determining, by a second computing device, a second series of temperature set points that change the energy response of the building to use less energy and diverge from the comfort preference; and
   transmitting, by a second computing device, the determined second series of temperature set points to the thermostat of the building.

19. The method of claim 18, wherein the second computing device is operated by an energy provider.

20. The method of claim 18, further comprising determining, by the second computing device, an amount of energy saved by changing the predicted energy responses of the building to use less energy.

21. The method of claim 18, further comprising, by the second computing device, translating the amount of energy saved into a corresponding energy consumption cost.

22. The method of claim 1, further comprising
   determining, by the first computing device, a price for energy available to be supplied to the building;
   determining, by the first computing device, an amount of stored energy associated with the building based on the predicted energy responses and the minimal energy requirements; and
   transmitting, by the first computing device, an energy consumption action to the thermostat of the building based on the amount of stored energy and the price for energy.

23. The method of claim 22, wherein the amount of stored energy is determined at different points during a given time period.

24. The method of claim 1, wherein the step of generating thermal response coefficient sets for the building is further based on smart meter data.

25. The method of claim 1, further comprising controlling, by the thermostat, use of temperature-affecting devices in the building based on the series of temperature set points received from the first computing device.

26. The method of claim 25, wherein the temperature-affecting devices include fans, humidifiers, and light shades.

27. The method of claim 1, wherein the weather data associated with the location of the building includes current weather conditions, forecast weather conditions, solar load, wind speed, and outdoor temperature.

28. The method of claim 1, wherein determining a series of temperature set points further comprises
   updating, by the first computing device, the energy responses based upon subsequent changes to the weather data;
   determining, by the first computing device, an updated series of temperature set points for the building based upon the updated energy responses; and
   transmitting, by the first computing device, the updated series of temperature set points to the thermostat.

29. The method of claim 28, wherein the subsequent changes to the weather data include changes to forecasted weather.

30. A computerized system for optimizing and controlling the energy consumption of a building, the system comprising a first computing device configured to:
   generate a plurality of thermal response coefficient sets for the building based on energy characteristics of the building and weather data associated with the location of the building, wherein each thermal response coefficient set is generated for a different projection of weather conditions at the location of the building for a given time period, including:
      receiving an indoor air temperature of the building;
      inferring physical structure data of the building based upon the location of the building;
      determining a transient temperature within one or more walls of the building based upon indoor air temperature and the weather data associated with the location of the building; and
      adjusting the physical structure data based upon the transient temperature; and
      generating the plurality of thermal response coefficient sets for the building based upon the adjusted physical structure data;
   predict energy responses of the building, each energy response based on a different set of thermal response coefficients;
   select minimal energy requirements based on an energy consumption cost associated with the building;
   determine a series of temperature set points for the building based on each predicted energy response and the minimal energy requirements; and
   transmit the series of temperature set points to a thermostat of the building.

31. The system of claim 30, wherein the physical structure data comprises at least one of: thermal mass, wind infiltration, relative area of windows, amount of insulation, material of construction, wind infiltration of the building, or efficiency of an associated HVAC system.

32. The system of claim 30, wherein the first computing device is further configured to rank the predicted energy responses based on predetermined criteria.

33. The system of claim 30, wherein predicting energy responses is further based on the energy consumption cost associated with the building.

34. The system of claim 33, wherein the energy consumption cost represents an amount of power required to change a temperature of the building for various external temperatures.

35. The system of claim 30, wherein the energy characteristics comprise an indoor temperature of the building and a status of an HVAC system in the building, wherein the HVAC system includes one or more stage heating or cooling units.

36. The system of claim 30, wherein the minimal energy requirements comprise a power consumption amount of an HVAC system in the building and a duty cycle of the HVAC system.

37. The system of claim 30, wherein determining the series of temperature set points is further based on weather forecast data, a comfort preference provided by an occupant of the building, or both.

38. The system of claim 30, wherein the first computing device is further configured to transmit the predicted energy responses to a remote computing device for display to a user.

39. The system of claim 38, wherein the first computing device is further configured to receive, from the remote computing device, a temperature preference based on input provided by the user.

40. The system of claim 30, wherein the series of temperature set points transmitted to the thermostat comprise a schedule for control of the thermostat over a period of time.

41. The system of claim 30, wherein the first computing device is further configured to receive the weather data from a network of remote sensors.

42. The system of claim 30, wherein the first computing device is further configured to receive thermostat data from a device connected to an HVAC system inside the building.

43. The system of claim 30, wherein the first computing device is further configured to adjust the generated thermal response coefficient sets for error correction.

44. The system of claim 43, wherein adjusting the generated thermal response coefficient sets includes filtering anomalies.

45. The system of claim 30, wherein the weather data includes current weather conditions at the location of the building, forecast weather conditions for the location of the building, solar load at the location of the building, or any combination thereof.

46. The system of claim 30, wherein the first computing device is further configured to
   compare the predicted energy responses of the building to one or more predicted energy responses of one or more other buildings; and
   rank the predicted energy responses of the building based on the comparison.

47. The system of claim 30, wherein the selected minimal energy requirements are based on at least a comfort preference provided by an occupant of the building and a second computing device is configured to
   determine a second series of temperature set points that change the energy response of the building to use less energy and diverge from the comfort preference; and
   transmit the determined second series of temperature set points to the thermostat of the building.

48. The system of claim 47, wherein the second computing device is operated by an energy provider.

49. The system of claim 47, wherein the second computing device is further configured to determine an amount of energy saved by changing the predicted energy responses of the building to use less energy.

50. The system of claim 47, wherein the second computing device is further configured to translate the amount of energy saved into a corresponding energy consumption cost.

51. The system of claim 30, wherein the first computing device is further configured to
   determine a price for energy available to be supplied to the building;
   determine an amount of stored energy associated with the building based on the predicted energy responses and the minimal energy requirements; and
   transmit an energy consumption action to the thermostat of the building based on the amount of stored energy and the price for energy.

52. The system of claim 51, wherein the amount of stored energy is determined at different points during a given time period.

53. The system of claim 30, wherein generating the thermal response coefficient sets for the building is further based on smart meter data.

54. The system of claim 30, wherein the thermostat is further configured to control use of temperature-affecting devices in the building based on the series of temperature set points received from the first computing device.

55. The system of claim 53, wherein the temperature-affecting devices include fans, humidifiers, and light shades.

56. The system of claim 30, wherein the weather data associated with the location of the building includes current weather conditions, forecast weather conditions, solar load, wind speed, and outdoor temperature.

57. The system of claim 30, wherein when determining a series of temperature set points, the first computing device is further configured to
   update the energy responses based upon subsequent changes to the weather data;
   determine an updated series of temperature set points for the building based upon the updated energy responses; and
   transmit the updated series of temperature set points to the thermostat.

58. The system of claim 57, wherein the subsequent changes to the weather data include changes to forecasted weather.

59. A computer program product, tangibly embodied in a non-transitory computer readable storage medium, for optimizing and controlling the energy consumption of a building, the computer program product including instructions operable to cause a first computing device to:
   generate a plurality of thermal response coefficient sets for the building based on energy characteristics of the building and weather data associated with the location of the building, wherein each thermal response coefficient set is generated for a different projection of weather conditions at the location of the building for a given time period, including;
      receiving an indoor air temperature of the building;
      inferring physical structure data of the building based upon the location of the building;
      determining a transient temperature within one or more walls of the building based upon indoor air temperature and the weather data associated with the location of the building; and
      adjusting the physical structure data based upon the transient temperature; and
      generating the plurality of thermal response coefficient sets for the building based upon the adjusted physical structure data;
   predict energy responses of the building, each energy response based on a different set of thermal response coefficients;
   select minimal energy requirements based on an energy consumption cost associated with the building;
   determine a series of temperature set points for the building based on each predicted energy response and the minimal energy requirements; and
   transmit the series of temperature set points to a thermostat of the building.

* * * * *